United States Patent [19]

Whittemore

[11] Patent Number: 5,252,526
[45] Date of Patent: Oct. 12, 1993

[54] INSULATING REFRACTORY

[75] Inventor: Dwight S. Whittemore, Bethel Park, Pa.

[73] Assignee: Indresco Inc., Dallas, Tex.

[21] Appl. No.: 768,472

[22] Filed: Sep. 30, 1991

Related U.S. Application Data

[63] Continuation of Ser. No. 174,938, Mar. 30, 1988, abandoned.

[51] Int. Cl.$^5$ .............................................. C04B 35/10
[52] U.S. Cl. ..................................... 501/127; 501/80; 501/128; 501/129; 501/130
[58] Field of Search ............... 501/128, 129, 133, 130, 501/80, 127

[56] References Cited

U.S. PATENT DOCUMENTS

| | | | |
|---|---|---|---|
| 3,301,635 | 1/1967 | Bergna et al. | 23/182 |
| 4,135,939 | 1/1979 | Campana | 106/68 |
| 4,144,195 | 3/1979 | Siebels | 252/455 R |
| 4,174,331 | 11/1979 | Myles | 260/29.1 R |
| 4,248,752 | 2/1981 | Myles | 260/29.1 R |
| 4,642,360 | 2/1987 | Nojiri et al. | 549/534 |
| 4,687,752 | 8/1987 | Peters | 501/155 X |
| 4,874,726 | 10/1989 | Kleeb et al. | 501/128 X |
| 4,992,397 | 2/1991 | Hughes, Jr. | 501/128 X |

OTHER PUBLICATIONS

Condensed Chemical Dictionary, Hawley, (1991), pp. 97, 219, 493.
*Dictionary of Ceramics*, by A. E. Dodd pp. 21, 61, 153, 160 (1965).

*Primary Examiner*—Karl Group

[57] ABSTRACT

A refractory mix for forming high strength, low thermal conductivity refractory shapes comprising from about 40 to 75% by weight of at least one dense refractory aggregate, about 10 to 30% by weight of a bonding agent, and about 5 to 25% by weight of hollow ceramic microspheres having a diameter of about 1 to 350 microns.

6 Claims, No Drawings

INSULATING REFRACTORY

This application is a continuation of application Ser. No. 174,938 filed Mar. 30, 1988, now abandoned.

BACKGROUND OF THE INVENTION

The present invention relates to high strength insulating refractory shapes and particularly brick suitable for use as backup brick in metallurgical vessels and working face linings for rotary kilns.

Typically such brick as now commonly used contain at least one lightweight aggregate to increase porosity and insulating properties and are manufactured by a variety of processes including the conventional mixing and pressing procedures used to make brick and are burned in periodic or tunnel kilns. Aggregates used for this purpose include, for example, bubble alumina, perlite, diatomite, and expanded clay, shale or other expanded mineral aggregates.

However, such aggregates have not proven satisfactory since the resultant brick lack the high strength required as well as the high insulating properties desired. Equally important, such aggregates make it difficult to produce brick of substantially uniform size, weight, and density resulting in difficulties in making satisfactory vessel linings using such brick.

Due to segregation and breakdown of such aggregates because of their lighter weight in the mix and low strength, there is inconsistent brick-to-brick weight and density. Also, because of the low refractoriness of most such lightweight aggregates as well as their nonuniformity there often occurs significant variation in size of the brick after firing due to inconsistent linear burning change and squeezing of the brick when stacked in kiln cars. Efforts to overcome these problems have not been successful.

SUMMARY OF THE INVENTION

The present invention overcomes the problems of the prior art and provides high strength insulating refractory shapes, particularly brick having a more uniform density and size.

Briefly stated, the present invention comprises a refractory mix for forming high strength, low thermal conductivity refractory shapes comprising about 40 to 75% by weight of at least one refractory aggregate, about 10 to 30% by weight of a bonding agent, and about 5 to 25% by weight of hollow ceramic microspheres having a particle size no larger than about 350 microns.

The invention also comprises the resultant refractory shape and the method of making such shape.

DETAILED DESCRIPTION

While the invention is broadly directed to any refractory shape, it will be discussed broadly with respect to the preparation of brick.

The essential material in the instant invention is the hollow ceramic microspheres. Combined with at least conventional dense refractory aggregate and bonding agent used to make brick this is what gives the refractory shape its high strength and improved insulating properties.

Other materials conventionally used in making brick can be added for their usual purposes and in their usual amounts. Thus, binders; with lignosulfonates being an example, can be added for the purpose of holding the brick together in the green state and other pressing aids; such as used motor oil, for the purpose of acting as a lubricant between the grains. Also, materials such as silica can be added to provide additional reheat expansion and alumina can be added to improve refractoriness. Silica addition also provides the brick with improved load bearing capability.

As to the dense refractory aggregate, it can be any conventionally used in forming refractory shapes, particularly brick. Aggregates such as calcined clay, calcined bauxite, calcined bauxitic kaolin, kyanite, and the like and mixtures thereof can be used.

As to the bonding agent, it can be any used in making brick with bonding clay; calcined alumina, and fine silica being examples. A bonding clay such as ball clay, bentonite, or mixtures thereof is preferred.

As to the hollow ceramic microsphere, it can be any alumina or silica/alumina ceramic microsphere having a particle size of about 1 to 350 microns; with a particle size of 30 to 300 microns being preferred. Ceramic hollow microspheres consisting of silica/alumina minerals are preferred and are commercially available under the name FILLITE.

As to proportions, for each 100% by weight of the mix there is from about 40 to 75% by weight dense refractory aggregate, about 10 to 30% by weight bonding agent, and about 5 to 25% by weight of the ceramic microspheres. If desired, the microspheres can be used in conjunction with other lightweight aggregates as noted above to reduce the cost of the mix. If materials such as kyanite, silica, and/or alumina are used, they are added in an amount of about 5 to 15% by weight.

The mix can be formed by simply mixing the dense refractory aggregate(s), bonding agent, and the ceramic hollow microspheres; and any other additives, in a conventional mixer, such as a Lancaster mixer; preferably with the muller raised to avoid excessive breakdown of the mix components. The mix is then shaped by being pressed to size using a fixed weight or volume of the mix to the mold box and burned. In the case of forming brick, any conventional brick press and brick-forming pressures can be used, but low forming pressures of about 1,000 to 5,000 psi are preferred so as not to compact the brick to too high a density. Also, burning is carried out at conventional temperatures; i.e., about 2,100° to 2,700° F.

This invention will be further described in connection with the following examples which are set forth for purposes of illustration only.

EXAMPLES 1 TO 6

A series of mixes were made with various refractory and lightweight aggregates. The mix formulations are set forth in Table I below. All the mixes were mixed in a Lancaster mixer with the muller removed to avoid breakdown and were sequentially mixed to avoid excessive balling. The loose bulk densities were checked for each mix and brick formed from each mix by pressing to size using a fixed weight of feed to the mold box of the brick press.

The bricks were then burned at 2,350° F. and tested and the results are also set forth in Table I below.

TABLE I

| Example: | 1 | 2 | 3 | 4 | 5 | 6 |
|---|---|---|---|---|---|---|
| Mix: | | | | | | |
| Calcined Flint Clay, - 10 mesh | 16 | 25 | 41 | 33 | 25 | 25 |
| Calcined Flint Clay, BMF | 20.5 | — | — | — | 3 | — |
| 80 Grade Chinese Bauxite, BMF | — | 28 | — | — | — | 20 |
| Kyanite, - 35 m | 14.5 | — | 14.5 | 14.5 | 14.5 | — |
| Gleason Ball Clay | 29.5 | — | 25 | 25 | 25 | — |
| S.D. Reighley Clay | — | 30 | — | — | — | 25 |
| Bentonite (Beaverbond) | 2.5 | — | 2.5 | 2.5 | 2.5 | — |
| Perlite, Brouk GSHW | 17 | 17 | — | — | — | — |
| Ceramic hollow microspheres (Fillite 52/7/S) | — | — | 17 | 15 | 10 | 10 |
| Expanded mineral aggregate (Verilite, 50 pcf) | — | — | — | 10 | 20 | 20 |
| Plus Additions: | | | | | | |
| Lignosulfonate (Silicanit) | 1.5 | 1.5 | 1.4 | 1.4 | 1.5 | 1.5 |
| Water | 7.5 | 7.0 | 5.6 | 5.1 | 5.5 | 5.0 |
| Loose Bulk Density, pcf: | 35 | 37 | 55 | 56 | 57 | 57 |
| Forming Pressure, psi: | 1500 | 1250 | 1200 | 1350 | 1400 | 1500 |
| Green Density, pcf: | 95 | 92 | 102 | 102 | 105 | 106 |
| Burn: | Cone 11, 2350° F. - 6 Hours | | | | | |
| % Linear Change: | −1.7 | −1.9 | −0.9 | −1.6 | −1.6 | −1.9 |
| Bulk Density, pcf (Av 3): | 89 | 88 | 94 | 96 | 99 | 102 |
| Apparent Porosity (Av 3): | 46.2 | 48.2 | 41.4 | 38.7 | 37.9 | 39.3 |
| Apparent Specific Gravity (Av 3): | 2.64 | 2.71 | 2.57 | 2.51 | 2.56 | 2.68 |
| Modulus of Rupture, psi (Av 3): | 1080 | 1020 | 990 | 890 | 920 | 1000 |

Of particular significance as shown by the test results is a reduction in the mold box fill and compaction ratio observed in Examples 3-6 which contained FILLITE. This is manifested in an increase in loose bulk density but without a significant increase in pressed density. The practical significance of this unexpected result is that more uniform mold box fill can be achieved and therefore more uniform density as pressed from brick-to-brick.

The other important finding is that the amount of shrinkage in firing the brick was reduced when FILLITE replaced perlite in Example 3. This means that sizing uniformity is more consistant during commercial manufacture of brick.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The refractory mix for forming high strength, low thermal conductivity brick consisting, for each 100% by weight thereof, of 40 to 75% by weight of a dense refractory aggregate which is a calcined clay, calcined bauxite, calcined bauxitic kaolin, kyanite or mixture thereof, 10 to 30% by weight of a bonding agent which is a ball clay, bentonite or mixtures thereof 5 to 25% by weight of hollow ceramic microspheres consisting of hollow silica-alumina microspheres having a diameter of about 30 to 300 microns, and 5 to 15% by weight of a lightweight aggregate which is a bubble alumina, perlite, vermiculite, diatomite, expanded shale, clay, or mixtures thereof.

2. The refractory mix for forming high strength, low thermal conductivity brick consisting, for each 100% by weight thereof, of 45 to 75% by weight of a dense refractory aggregate which is a calcined clay, calcined bauxite, calcined bauxitic kaolin, kyanite or mixture thereof, 10 to 30% by weight of a bonding agent which is a ball clay, bentonite, or mixture thereof, 5 to 25% by weight of a lightweight aggregate consisting of hollow silica-alumina microspheres having a diameter of about 30 microns.

3. The refractory mix for forming high strength, low thermal conductivity brick consisting of, for each 100% by weight thereof, 45 to 75% by weight of a dense refractory aggregate which is a calcined clay, calcined bauxite, calcined bauxitic kaolin, kyanite or mixture thereof, 10 to 30% by weight of a bonding agent which is a ball clay, bentonite, or mixture thereof, 5 to 25% by weight of hollow ceramic microspheres consisting of hollow silica-alumina microspheres having a diameter of about 30 microns, and a pressing aid for assisting in forming the brick during pressing.

4. The refractory mix for forming high strength, low thermal conductivity brick consisting, for each 100% by weight thereof, of 45 to 75% by weight of a dense refractory aggregate which is a calcined clay, calcined bauxite, calcined bauxitic kaolin, kyanite or mixture thereof, 10 to 30% by weight of a bonding agent which is a ball clay, bentonite, or mixture thereof, 5 to 25% by weight of hollow ceramic microspheres consisting of hollow silica-alumina microspheres having a diameter of 30 to 300 microns, 5 to 15% by weight of a lightweight aggregate which is a bubble alumina, perlite, vermiculite, diatomite, expanded shale, clay, or mixture thereof, and a pressing aid for assisting in forming the brick during pressing.

5. A method of forming a brick comprising pressing the mix of any one of claims 1, 2, 3, and 4 into a shape and burning the shaped mix at a temperature and for a time sufficient to form the brick into its final form.

6. A high strength insulating brick consisting of the burned refractory mix of any one of claims 1, 2, 3 and 4.

* * * * *